United States Patent [19]

Maruyama et al.

[11] Patent Number: 5,650,985
[45] Date of Patent: Jul. 22, 1997

[54] APPARATUS FOR LOCKING A MOVABLE MEMBER OF A CD PLAYER

[75] Inventors: Shigeo Maruyama; Fumiya Yamada; Kiyohito Kajihara; Toshinori Kaya; Jun Togashi, all of Saitama-ken, Japan

[73] Assignee: Pioneer Electronic Corporation, Tokyo, Japan

[21] Appl. No.: 711,311

[22] Filed: Sep. 3, 1996

Related U.S. Application Data

[63] Continuation of Ser. No. 359,855, Dec. 20, 1994, abandoned, which is a continuation of Ser. No. 101,232, Aug. 2, 1993, abandoned.

[30] Foreign Application Priority Data

Aug. 3, 1992 [JP] Japan ................... 4-226387

[51] Int. Cl.$^6$ ................................. G11B 17/22
[52] U.S. Cl. ................................. 369/36
[58] Field of Search .......... 369/36, 75.2, 75.1, 369/77.2, 34; 360/133, 98.06, 98.04, 99.02, 99.06, 98.05

[56] References Cited

U.S. PATENT DOCUMENTS

| | | | |
|---|---|---|---|
| 4,592,039 | 5/1986 | Toyoguchi et al. | 369/75.2 |
| 4,694,448 | 9/1987 | Tamaru et al. | 369/77.2 |
| 5,058,090 | 10/1991 | Ueno et al. | 369/36 |
| 5,123,001 | 6/1992 | Nakamichi et al. | 369/36 |
| 5,142,522 | 8/1992 | Muramatsu et al. | 369/75.2 |
| 5,159,585 | 10/1992 | Ikedo et al. | 369/36 |
| 5,247,500 | 9/1993 | Miyoshi et al. | 369/36 |
| 5,274,619 | 12/1993 | Suzuki | 369/77.2 |

FOREIGN PATENT DOCUMENTS

| | | | |
|---|---|---|---|
| 396255 | 11/1990 | European Pat. Off. | 369/36 |
| 1-151057 | 6/1989 | Japan | 369/36 |
| 4111277 | 4/1992 | Japan | 369/36 |

*Primary Examiner*—Stuart S. Levy
*Assistant Examiner*—Allen Cao
*Attorney, Agent, or Firm*—Nikaido, Marmelstein, Murray & Oram LLP

[57] ABSTRACT

A CD player has an inner casing, a plurality of magazines provided in the casing, each of the magazines storing a plurality of CDs, a lifting device, and a movable member or casing. The movable casing has a reproducing device, a loading device for loading one of the CDs on the reproducing device, and is adapted to be lifted by the lifting device. A lock plate is slidably provided on a wall of the movable casing. A lock device is provided to drive the lock plate to engage locking teeth on the inner casing for locking the lock plate to the wall of the inner casing to prevent vertical movements of the movable member while in a playing position.

3 Claims, 5 Drawing Sheets

1

APPARATUS FOR LOCKING A MOVABLE MEMBER OF A CD PLAYER

This application is a continuation of application Ser. No. 08/359,855, filed Dec. 20, 1994, now abandoned, which is a continuation of application Ser. No. 08/101,232 filed Aug. 2, 1994, now abandoned.

BACKGROUND OF THE INVENTION

The present invention relates to an apparatus for locking a movable casing for vertically moving a reproducing device for reproducing a selected disc of a CD player having a plurality of magazines each of which stores a plurality of discs.

Recently, a CD player having a magazine has been provided for continuously reproducing a plurality of discs.

Furthermore, a CD player having a plurality of magazines has been provided to avoid trouble in changing the discs.

In a car CD player, problems of the mounting space, humidity, vibration, dust and operability must be considered.

FIG. 5 shows a conventional CD player 1 having an inner casing 3 provided with three magazine holders 2. A magazine 10 is detachably inserted in each magazine holder 2 passing through an inlet 5 provided on a front panel 4. As shown in FIG. 6, each magazine 10 has a plurality of vertically disposed trays 11 each of which holds a compact disc (CD). The magazine 10 has openings 12 at a side thereof corresponding to the trays 11.

In the inner casing 3, a movable casing 31 having a loading device and a reproducing device including a turntable, a pickup, and a clamp device are provided on a rear portion thereof. The movable member such as casing 31 is designed so as to be vertically moved along the magazines by a lifting device 30 for reproducing a selected CD in the magazine.

The lifting device 30 comprises a pantograph each side of which having a pair of arms 32 and 33 provided between side plates of the movable casing 31 and a base plate of the inner casing 3. The arm 32 is slidably mounted on the side plate of the casing 31 at an upper end portion and pivoted on the base plate of the casing 3 at a lower end portion. The arm 33 is pivoted on the side plate at an upper end portion and slidably mounted on the base plate at a lower end portion. The arms 32 and 33 are crossed with each other at the central portions thereof.

In operation, if one of the discs is selected, the device 30 is vertically moved to move the casing 31 to a desired position. An end of a loading lever of the loading device is inserted into the opening 12 and engaged with a selected tray 11 to rotate the tray about an axis 13 as shown by an arrow to a playback position in the casing. Then the disc is removed from the tray and clamped on the turntable by a clamper.

However, in such a car CD player, the vertically movable casing 31 may be vibrated in a vertical direction by the vibration of the car.

SUMMARY OF THE INVENTION

An object of the present invention is to provide a CD player which may restrain vertical vibration of the movable casing, thereby providing reproduction stability.

According to the present invention, there is provided a CD player having a plurality of magazines each of which stores a plurality of trays for holding discs comprising a movable member or casing having a reproducing device for reproducing the disc and a loading device for loading a selected tray from the magazine, and a lifting device for lifting the movable casing to the selected disc.

A lock device is provided for locking the movable casing in a vertical position during the reproduction process.

In the present invention, since the movable casing is held in a locked state during reproduction, any vertical vibration of the movable casing is restrained.

The other objects and features of this invention will become understood from the following description with reference to the accompanying drawings.

DETAILED DESCRIPTION OF THE PREFERRED EMBODIMENT

Figure 1:
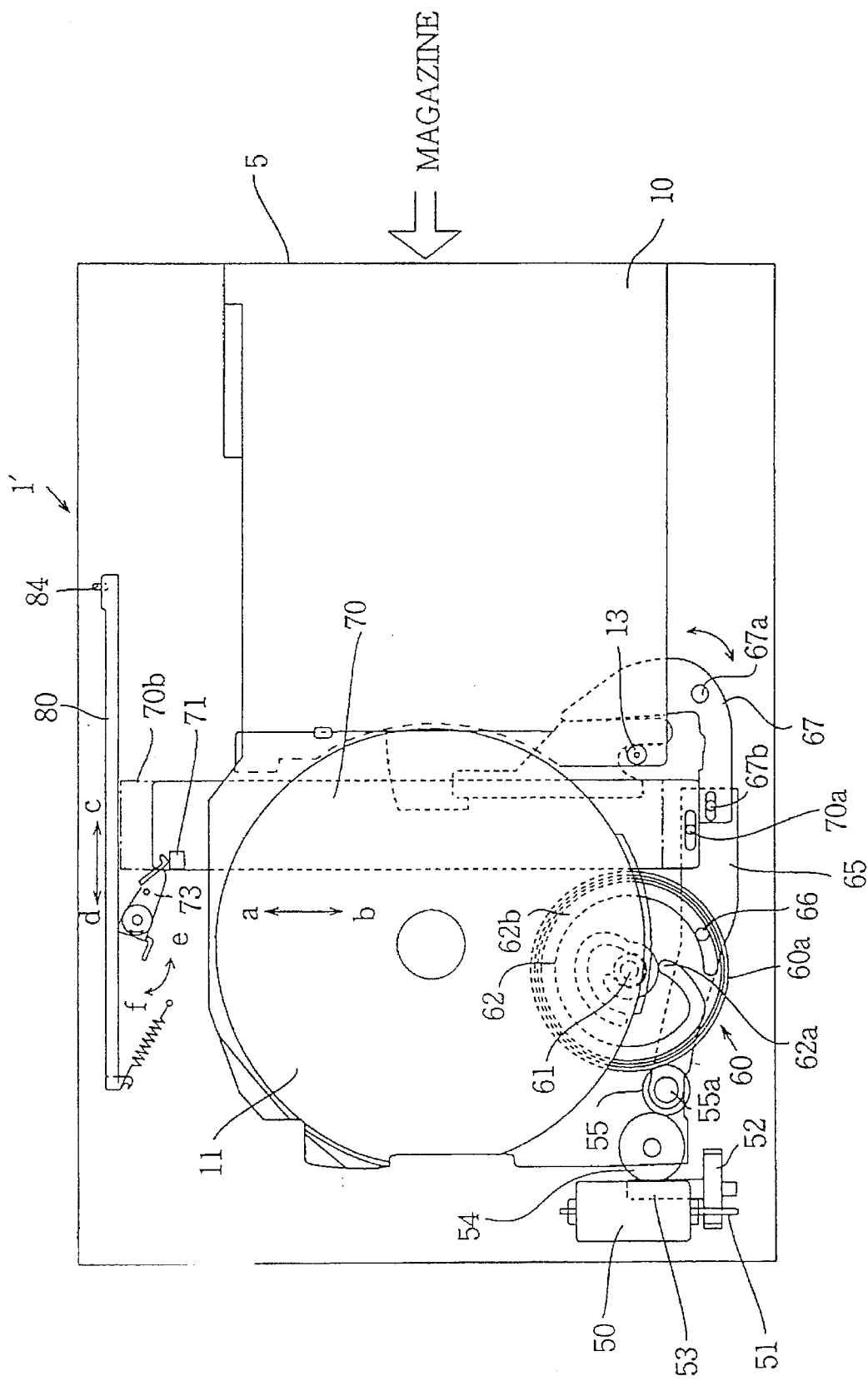
FIG. 1 is a plan view of a locking device for a CD player according to the present invention.
Figure 5:
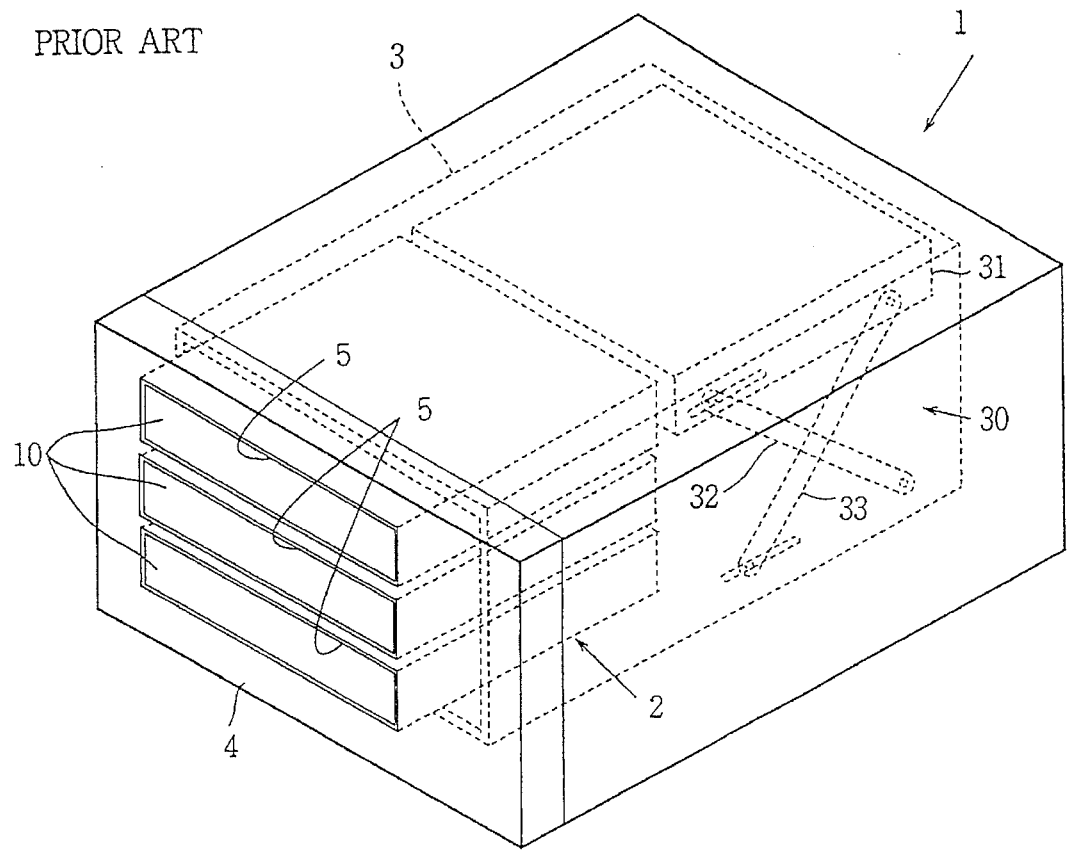
FIG. 5 is a perspective view schematically showing a conventional CD player.
Figure 6:
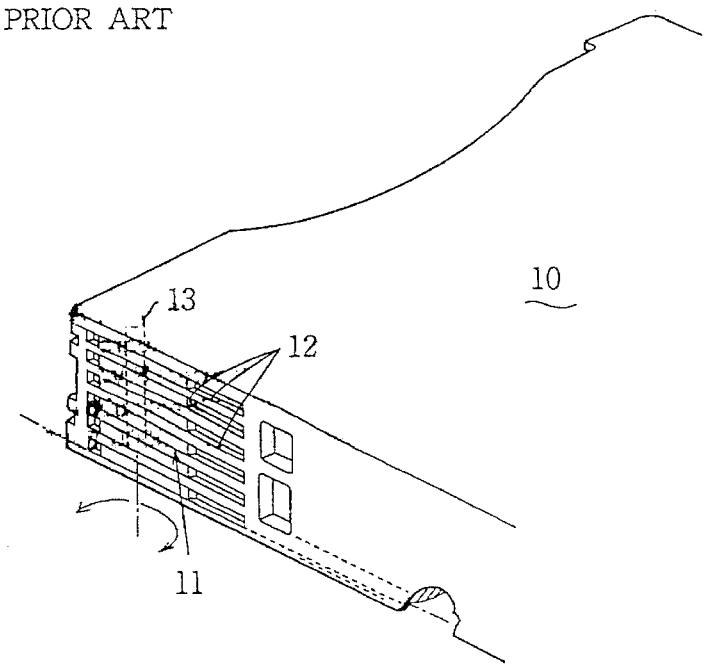
FIG. 6 is a perspective view showing a part of a magazine.

Referring to FIG. 1 showing a CD player 1', the same parts as the conventional one are identified with the same reference numeral as FIGS. 5 and 6.

A motor 50 is mounted in the movable casing 31 for driving various mechanism. A rotating shaft 51 of the motor 50 is connected to a worm wheel 52 through a worm (not shown) mounted on the shaft. A worm 53 is coaxially mounted on the worm wheel 52.

The worm 53 is connected to a gear 55 through a worm wheel 54. The gear 55 is engaged with a teeth 60a formed on a periphery of a disc cam 60 so as to rotate the cam. The disc cam 60 is pivotally mounted on a shaft 61 and has a cam groove 62. A slide lever 65 having an engaging pin 66 is pivotally mounted on a shaft 55a at an end portion thereof. The pin 66 is provided at a central portion of the lever to be engaged with the cam groove 62. Thus, the lever 65 is moved by the cam groove 62. The other end of the slide lever 65 is connected to a loading lever 67 by a pin 67b.

The end of the slide lever 65 is further connected to an end portion of a slide plate 70 by a pin 70a. The slide plate 70 is slidably mounted in the casing 31 and moved in the directions shown by arrows a and b by the slide lever 65. The slide plate 70 has a projection 71 formed on the other end.

Figure 2:
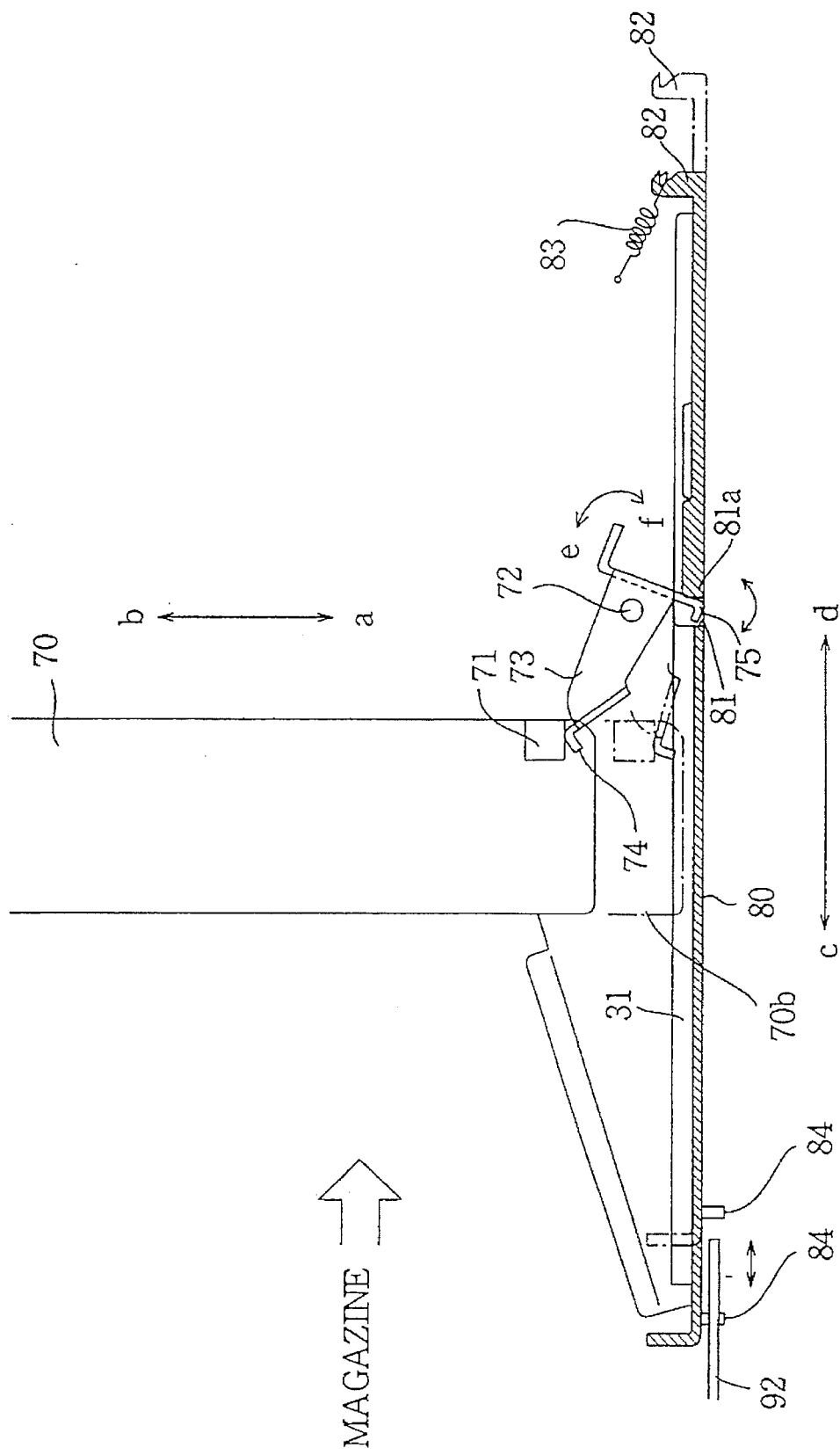
FIG. 2 is an enlarged sectional plan view of a part of the locking device.
Figure 3:
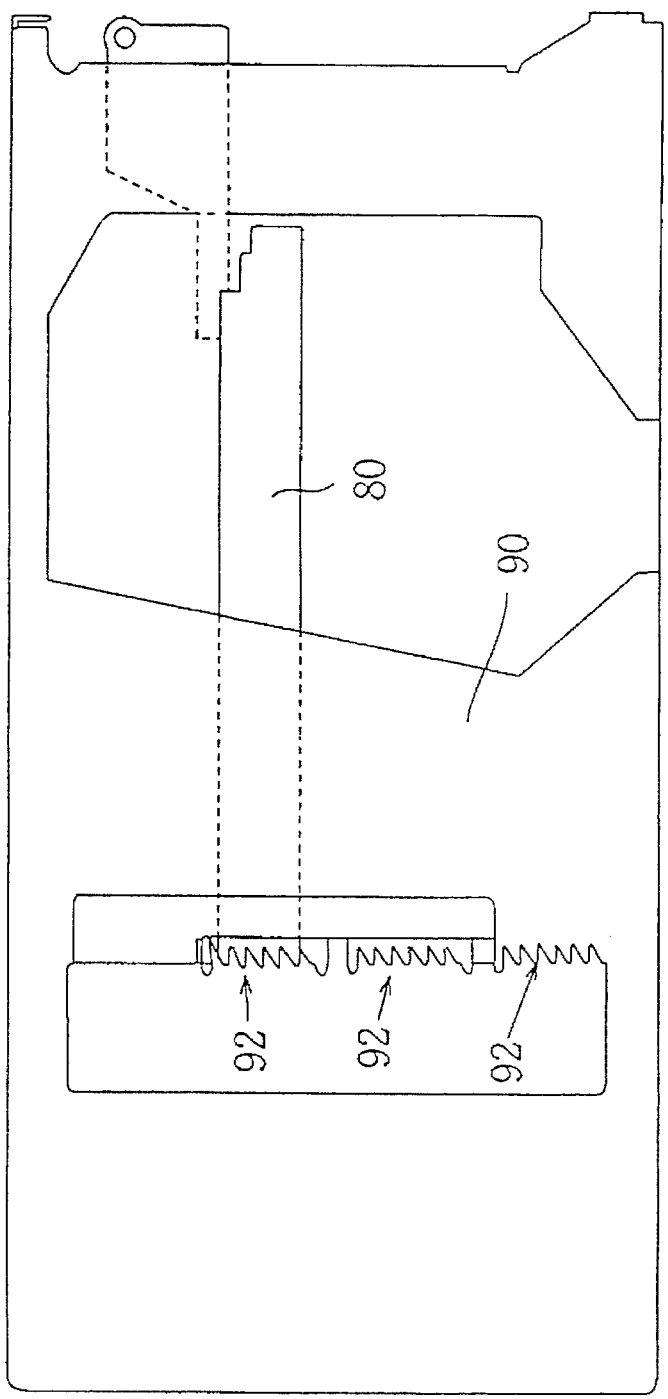
FIG. 3 is a side view of a part of the locking device.

The slide plate 70 is connected to a lock device comprising a lever 73 and a lock plate 80. Referring to FIG. 2, the lever 73 is pivotally mounted on a shaft 72 provided in the casing 31. The lever 73 has an engaging lug 74 engaged with the projection 71 of the slide plate 70 and an actuating end 75. The lock plate 80 is secured to the movable casing 31 and slidably mounted in the casing 31. The lock plate 80 has a hook 82 formed at an end, a pin 84 provided on the other end, and an opening 81 to be engaged with the actuating end 75 of the lever 73. A spring 83 is provided between the hook 82 and the casing 31 to urge the lock plate 80 in the direction shown by an arrow c.

When the slide plate 70 is moved in the direction a, the projection 71 engages with the lug 74 of the lever 73 to rotate the lever in the counterclockwise direction e. Thus, the actuating end 75 of the lever engaged with the wall of the opening 81 of the plate 80 pushes the plate in the direction d against the spring 83.

When the slide plate 70 is moved in the direction b, the projection 71 is disengaged from the lug 74. The lock plate 80 is moved horizontally in the direction c by the spring 83. The edge 81a of the opening 81 pushes the actuating end 75 to rotate the lever 73 in the clockwise direction f.

Figure 4:
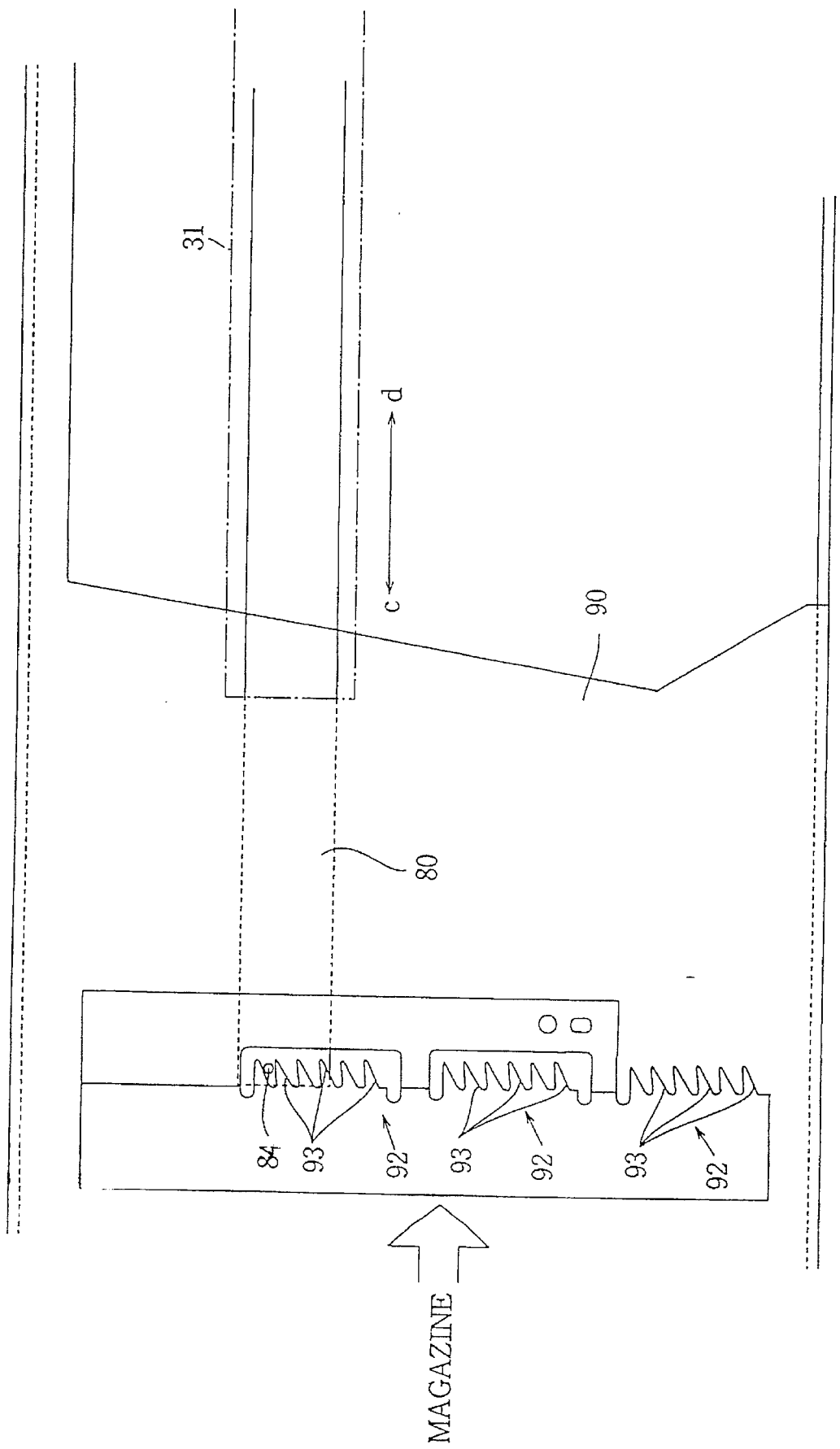
FIG. 4 is an enlarged side view showing a part of the locking device.

Referring to FIG. 4, a side frame 90 of inner casing 3 is provided adjacent to the side of the magazine holder 2. The frame 90 has three groups of locking teeth 92, each tooth having an inclined locking underside 93. Each group of teeth arranged in a vertical direction is provided for the corresponding magazine 10. The number of notches of each underside inclined locking surface 93 coincides with the number of trays 11 of the magazine 10.

The operation of the CD player will be described hereinafter.

When the tray 11 is in the magazine 10, the cam 60 is at an initial position where the pin 66 of the lever 65 is at a position 62a of the cam groove 62. In this state, the lever 65 is positioned adjacent the shaft 61 of FIG. 1. Consequently, the loading lever 67 is positioned for housing the tray 11 in the magazine 10 and the slide plate 70 is located at a position shown by a dotted-dash line 70b in FIGS. 1 and 2. Therefore, the lever 73 and lock plate 80 are located at positions shown by dotted-dash lines in FIG. 2. When one of the CDs is selected, the lifting device 30 is operated to vertically move the movable casing 31 to the selected CD. The motor 50 starts to rotate the disc cam 60 in the counterclockwise direction so that the pin 66 is moved in the cam groove 62 to a position 62b of the cam groove 62. Thus, the slide lever 65 is moved to the position shown in FIG. 1. Accordingly, the loading lever 67 is turned in the counterclockwise direction about a shaft 67a to the position of FIG. 1, so that one of trays 11 is pivoted about the axis 13 by the lever 67 to the loading position.

At the same time, the slide plate 70 is moved in the direction b to release the projection 71 from the lug 74 of the lever 73. Thus, the lock plate 80 is moved in the direction c by the spring 83 so that the pin 84 is engaged with the locking underside surface 93 of one of the teeth 92 corresponding to the vertical position of the tray having the selected CD. Consequently, the movable casing 31 is secured to the side frame 90 by the engagement of the pin 84 with the teeth 92.

Thus, the casing 31 is prevented from vertical vibration caused by the vibration and shock during the driving of the vehicle, thereby preventing reproduction of the information on the CD from jumping. When the playing of the CD finishes, the motor 50 operates in reverse to rotate the cam 60 in the clockwise direction. Thus, the CD is released from the turntable and put on the tray 11. When the cam 60 is reversely rotated, the loading lever 67 is turned in the reverse direction to turn the tray into the magazine. The slide plate 70 is moved in the direction a to rotate the lever 73 in the direction e so that the end 75 is engaged with the edge 81a of the opening 81 to move the lock plate 80 in the direction d against the spring 83. Thus, the pin 84 is disengaged from the underside surface 93 of the tooth 92 to release the lock of the movable casing 31.

Thus, the movable casing can be moved to a newly selected CD.

When the power is turned off during the reproduction, the lifting device 30 is held in the locked position.

In accordance with the present invention, a lock device is provided for locking the vertically moving member during the reproduction of the CD, thereby restraining the vibration of the CD. Thus, the reproduction of the information is prevented from jumping, and hence the CD is stably reproduced.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a compact disk (CD) player comprising an inner casing (3);

a plurality of magazines (10) provided in the inner casing, each of the magazines storing a plurality of CDs in trays (11) therein;

a movable member (31) moving vertically along the magazines including a reproducing device;

a lifting device (30) for lifting said movable member in a vertical direction to a level of a selected CD; and a loading device for loading the selected CD from a magazine onto the reproducing device;

an improvement comprising a locking apparatus for locking the movable member in a position to which it has been lifted by said lifting device for loading and playing the selected CD, said locking apparatus further comprising:

a plurality of locking teeth (92) rigidly fixed to a side frame (90) of the CD player, providing a number of notches vertically arranged in line coinciding with a number of trays in said magazines, each of the notches having an inclined locking side (93);

a lock plate (80) horizontally movably secured to the movable member (31) and having a lock pin (84) secured thereto; and driving means (83) for horizontally moving the lock plate (80) with respect to the movable member (31) to engage the lock pin (84) with the inclined locking side of said locking teeth (92) in a locked position corresponding to the selected CD to prevent any vertical movement of the movable member (31) relative to said inner casing (3) while the movable member (31) is held in said loading and playing position.

2. A CD player according to claim 1 wherein said locking teeth are formed with an inclined surface that is engaged by the lock pin in the locked position.

3. A CD player according to claim 1 wherein the lock plate is slidably moved with respect to the movable member to the locked positions.

* * * * *